(12) United States Patent
Zhang

(10) Patent No.: US 12,021,849 B2
(45) Date of Patent: Jun. 25, 2024

(54) PRIVACY COMPUTING-ENABLED MIGRATION METHOD FOR LARGE-SCALE PERSISTENT DATA ACROSS PLATFORMS

(71) Applicant: Nanhu laboratory, Jiaxing (CN)

(72) Inventor: Lei Zhang, Jiaxing (CN)

(73) Assignee: Nanhu laboratory, Jiaxing (CN)

( * ) Notice: Subject to any disclaimer, the term of this patent is extended or adjusted under 35 U.S.C. 154(b) by 0 days.

(21) Appl. No.: 18/325,206

(22) Filed: May 30, 2023

(65) Prior Publication Data

US 2024/0106806 A1 Mar. 28, 2024

(30) Foreign Application Priority Data

Sep. 27, 2022 (CN) .......................... 202211180672.6

(51) Int. Cl.
*H04L 9/40* (2022.01)
*H04L 9/06* (2006.01)
*H04L 9/08* (2006.01)
*H04L 9/32* (2006.01)

(52) U.S. Cl.
CPC ........ *H04L 63/0428* (2013.01); *H04L 9/0643* (2013.01); *H04L 9/0819* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 2013/0326614 | A1* | 12/2013 | Truskovsky | H04W 12/37 726/19 |
| 2014/0280859 | A1* | 9/2014 | Liu | H04L 63/10 709/223 |
| 2014/0325586 | A1* | 10/2014 | Halliday | H04W 12/30 726/1 |
| 2018/0191839 | A1* | 7/2018 | Condict | H04L 67/1097 |
| 2020/0328889 | A1* | 10/2020 | Matetic | H04L 9/32 |
| 2021/0266303 | A1* | 8/2021 | Pollutro | H04L 63/0435 |

OTHER PUBLICATIONS

Gupta, I., Singh, N. and Singh, A.K., 2019. Layer-based privacy and security architecture for cloud data sharing. Journal of Communications Software and Systems, 15(2), pp. 173-185. (Year: 2019).*
Wei, Z., Li, J., Wang, X. and Gao, C.Z., 2019. A lightweight privacy-preserving protocol for vanets based on secure outsourcing computing. IEEE Access, 7, pp. 62785-62793. (Year: 2019).*

* cited by examiner

*Primary Examiner* — Luu T Pham
*Assistant Examiner* — Edward X Long
(74) *Attorney, Agent, or Firm* — Harness, Dickey & Pierce, P.L.C.

(57) ABSTRACT

A privacy computing-enabled migration method for large-scale persistent data across platforms is provided. By virtue of a sealing key management service SKMS, based on trusted sealing and trusted connection which are the basic functions of privacy computing, large-scale migration of privacy data with low deployment cost, high security and high efficiency can be realized by providing download links to platforms that meet requirements, thus greatly improving the flexibility of data deployment and use and the landing of trusted sealing technology.

7 Claims, 3 Drawing Sheets

PRIVACY COMPUTING-ENABLED MIGRATION METHOD FOR LARGE-SCALE PERSISTENT DATA ACROSS PLATFORMS

CROSS-REFERENCE TO RELATED APPLICATION

This patent application claims the benefit and priority of Chinese Patent Application No. 202211180672.6 filed with the China National Intellectual Property Administration on Sep. 27, 2022, the disclosure of which is incorporated by reference herein in its entirety as part of the present application.

TECHNICAL FIELD

The present disclosure relates to data migration technology in the field of privacy technology, and in particular to a privacy computing-enabled migration method for large-scale persistent data across platforms.

BACKGROUND

Privacy computing based on the CPU level is one of the most advanced technologies in the field of information security in recent years. Privacy computing refers to a trusted execution environment based on a chip-level trusted base, which is not controlled by a system layer or a kernel layer (that is, the data and operation in the security environment cannot be viewed, tampered with or controlled by one of the highest administrative authority of a computer system or the control right of the kernel layer), so as to ensure the security of data privacy protection and the credibility of data operation in the trusted execution environment. The corresponding technologies currently include Intel SGX technology and AMD SEV technology. Technologies corresponding to the chip-level hardware security environment (such as Intel SGX) have been widely used in general-purpose chips and integrated into general-purpose computers and servers in the market, such as Intel i3, i5 and i7 notebooks and PCs, and servers based on the third generation Xeon chips.

Privacy computing has a very important function: trusted sealing technology, such as Intel SGX sealing technology. Trusted sealing technology can directly generate a unique key (which is bound to the host hardware) by CPU hardware through an instruction set. The privacy data is encrypted based on the application running in enclave in the privacy computing security zone and is persistently placed in a disk. The key cannot be acquired by the outside world or people with the highest authority of the host. The encrypted data can only be loaded, decrypted and used by the same application running in enclave (based on SGX MrEnclave) or the application running in enclave developed by the same application developer (based on SGX MrSigner) on the same host (because the key is bound to the host hardware) in such a manner that the CPU hardware generates the same decrypted key through the instruction set.

The privacy computing-based trusted sealing technology mentioned above can ensure the security of data well, but at the same time, there is a significant defect that encrypted data cannot be flexibly migrated to other hosts. As described above, because the data sealing key is bound to the chip hardware, the data relevant to a privacy computing application on the host A can only be loaded, decrypted and used locally after being encrypted and placed in a disk, and cannot be directly decrypted and used by migrating to another host. If the host A is damaged, the encrypted data which is placed in a disk will never be decrypted and recovered. Therefore, the landing solution of the current privacy computing-based trusted sealing technology (such as Intel SGX Sealing) is inflexible and not friendly to user scenarios. The applicant has consulted a large number of materials, but there is no effective solution for the large-scale migration of trusted sealing technical data.

SUMMARY

The purpose of the present disclosure is to provide a privacy computing-enabled migration method for large-scale persistent data across platforms.

In order to achieve the above purpose, the present disclosure uses the following technical solution.

A privacy computing-enabled migration method for large-scale persistent data across platforms is provided, comprising the following steps:

S1, establishing a trusted connection between a Host0 security zone and a sealing key management service SKMS security zone; wherein a Host0 is a platform for sharing privacy data with other platforms;

S2, sending, by the Host0 security zone, a mapping table having an entry content which contains a download link, a download link hash value and authorized platform information to the sealing key management service SKMS security zone based on the trusted connection; wherein the Host0 sends the download link hash value to one or more Hosti; the Hosti is a platform for receiving shared privacy data, i=1, 2, ..., N;

S3, sending, by the Hosti, a data signature packet containing its own identity information to the sealing key management service SKMS;

S4, verifying, by the sealing key management service SKMS security zone, the authorized identity of the Hosti based on the data signature package and the mapping table, and establishing the trusted connection with the Hosti after passing verification;

S5, sending, by the sealing key management service SKMS security zone, the download link mapped by the Hosti to the corresponding Hosti security zone based on the trusted connection, and downloading, by the Hosti, privacy data based on the download link; wherein the privacy data is the data locally sealed by the Host0 in a trusted manner through the privacy computing-based trusted sealing technology;

S6, decrypting, by the Hosti, the privacy data based on an encryption key acquired in advance, and locally sealing the privacy data in a trusted manner through the privacy computing-based trusted sealing technology.

In the privacy computing-enabled migration method for large-scale persistent data across platforms described above, when the Host0 seals privacy data in a trusted manner, the trusted sealing manner based on MrX is adopted; MrX is Mrenclave or Mrsigner, the Mrenclave means that decryption is performed only when applications running in enclave are same, and the Mrsigner means that decryption is performed only when applications are developed by a same application developer, for example, Intel SGX technology base on chip-level privacy computing.

In the privacy computing-enabled migration method for large-scale persistent data across platforms described above, the data signature package of the Hosti is generated in the following manner:

measuring MrX_i by a hardware: acquiring an application measured value Mrenclave_i, application developer registration information Mrsigner_i and a hardware identifier pid_i, and signing "report" containing information about the application measured value, the application developer information and the hardware identifier by CPU hardware to generate the data signature package.

In the privacy computing-enabled migration method for large-scale persistent data across platforms described above, in step S6, the encryption key is a sealing key Ks provided by the Host0 for sealing corresponding privacy data, and the Hosti decrypts the privacy data in a security zone based on the sealing key Ks, and calls a hardware instruction set in the privacy computing security zone, such as Intel SGX EGETKEY instructions, to obtain a sealing key Ksi, and re-encrypts and seals the privacy data based on the sealing key Ksi;

in step S2, the entry content in the mapping table further includes the sealing key Ks and a sealing key ID identifier; the Host0 further sends the sealing key ID identifier to the one or more Hosti;

in step S5, the sealing key management service SKMS simultaneously sends the sealing key Ks mapped by the Hosti to the corresponding Hosti security zone.

In the privacy computing-enabled migration method for large-scale persistent data across platforms described above, when Host0 seals privacy data in a trusted manner, ID of the corresponding sealing key Ks is generated: Host0_Ks_ID=Host0_pid+TYPE+MrX;

where Host0_pid is a hardware CPU identifier of the Host0;

when TYPE=1, MrX is Mrenclave; and when TYPE=2, MrX is Mrsigner, and the sealing key ID identifier is: a hash value of Host0_Ks_ID, Hash(Host0_Ks_ID).

In the privacy computing-enabled migration method for large-scale persistent data across platforms described above, the mapping table comprises following information:

the sealing key ID identifier Hash(Host0_Ks_ID)—the sealing key Ks—a white list of a platform receiving shared privacy data {pid_t+TYPE_t+MrX_t}—a sealing encrypted data address {URL}—a sealing encrypted data address hash Hash({URL});

where pid_t are hardware CPU identifiers of other allowed platforms, and when pid_t is set to 0, it indicates that any hardware platform is allowed;

TYPE_t denotes allowing manner, and MrX_t is a value corresponding to the allowing manner; when TYPE_t=1, it indicates that when MrEnclave of an application running on other platform is verified as being satisfied, the application is allowed; when TYPE_t=2, it indicates that when MrSigner of an application running on other platform is verified as being satisfied, the other platform is allowed; and when TYPE_t=0, it indicates that it is not necessary to verify the allowing manner.

In the privacy computing-enabled migration method for large-scale persistent data across platforms described above, in step S3, the Hosti sends the data signature package+a sealing key Ks identifier Hash(Host0_Ks_ID)+Hash({URL}) to the sealing key management service SKMS;

in step S4, the sealing key management service SKMS verifies validity of the data signature package and extracts Mrenclave Mrsigner_i, TYPE_i and pid_i from the package to obtain Hash(Host0_Ks_ID)+pid_i+TYPE_i+MrX_i (Mrenclave_i or Mrsigner_i)+Hash({URL}) from the Hosti, verifies whether the received Hash(Host0_Ks_ID)+pid_i+TYPE_i+MrX_i (Mrenclave_i or Mrsigner_i)+Hash({URL}) has a matching entry with the mapping table based on the mapping table, and establishes trusted connection if there is the matching entry.

In the privacy computing-enabled migration method for large-scale persistent data across platforms described above, when the Host0 seals the privacy data in a trusted manner, a hardware instruction set is called in the privacy computing security zone, such as Intel SGX EGETKEY instructions, to obtain the sealing key Ks, the privacy data is encrypted and is wrote in a disk for storage based on the sealing key Ks, and a storage address is {URL};

the download link is the storage address URL of the privacy data, and the download link hash value is a corresponding address hash Hash({URL}).

In the privacy computing-enabled migration method for large-scale persistent data across platforms described above, in step S1, prior to establishing trusted connection between the Host0 security zone and the sealing key management service SKMS security zone, the method further comprises following steps:

executing, by the sealing key management service SKMS, a key management application App-SKMS in a privacy computing security zone;

establishing, by the Host0, TLS connection with the sealing key management service SKMS first, and measuring application App-SKMS in the sealing key management service SKMS security zone by hardware to obtain a measured value Mrenclave_SKMS, and signing and sending the measured value to the Host0 security zone;

verifying, by the Host0, validity of the signature based on a remote authentication mechanism, wherein when Mrenclave_SKMS is on a white list of the Host0, it indicates that the SKMS and application running thereon are trusted, and proceeding to step S1, otherwise, terminating process.

In the privacy computing-enabled migration method for large-scale persistent data across platforms described above, in step S6, before the Hosti seals the privacy data in a trusted manner, the trusted sealing manner MrX of the privacy data is selected first, in which TYPE_i=1 indicates the Mrenclave manner (in which decryption is performed only when the applications running in enclave are same), or TYPE_i=2 indicates the Mrsigner manner (in which decryption is performed only when the applications are developed by the same application developer); after the data migration from the Host0 to all Hosti is successful, the sealing key management service SKMS deletes the mapping table.

The present disclosure has the following advantage. In the solution, by virtue of a sealing key management service SKMS, based on trusted sealing and trusted connection which are the basic functions of privacy computing, large-scale migration of privacy data with low deployment cost, high security and high efficiency can be realized by providing download links to platforms that meet requirements, thus greatly improving the flexibility of data deployment and use and the landing of trusted sealing technology.

DETAILED DESCRIPTION OF THE EMBODIMENTS

The present disclosure will be further described in detail with reference to the attached drawings and specific embodiments hereinafter.

Figure 1:
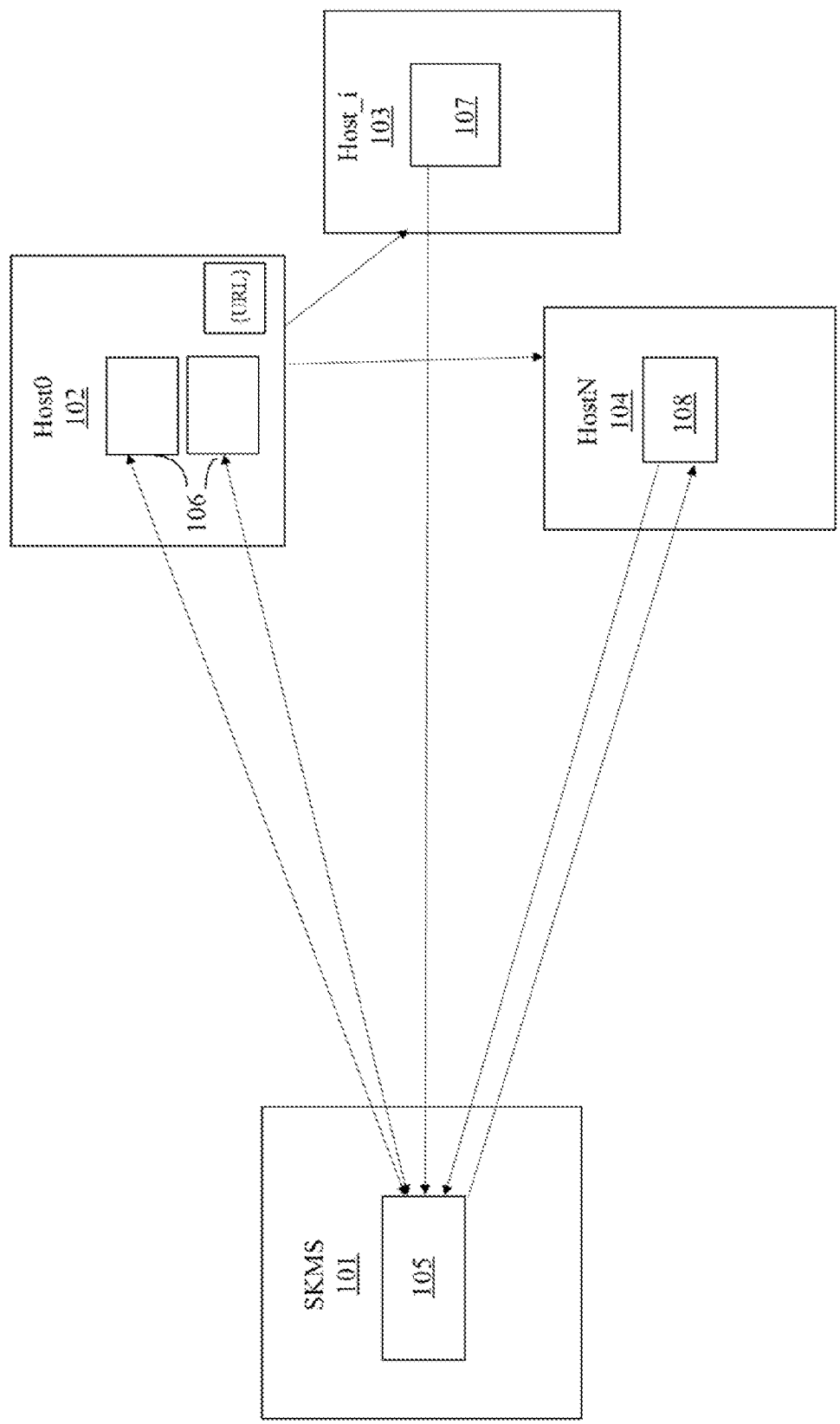
FIG. 1 is a block diagram of a migration process according to the first embodiment of the present disclosure.
Figure 2A:
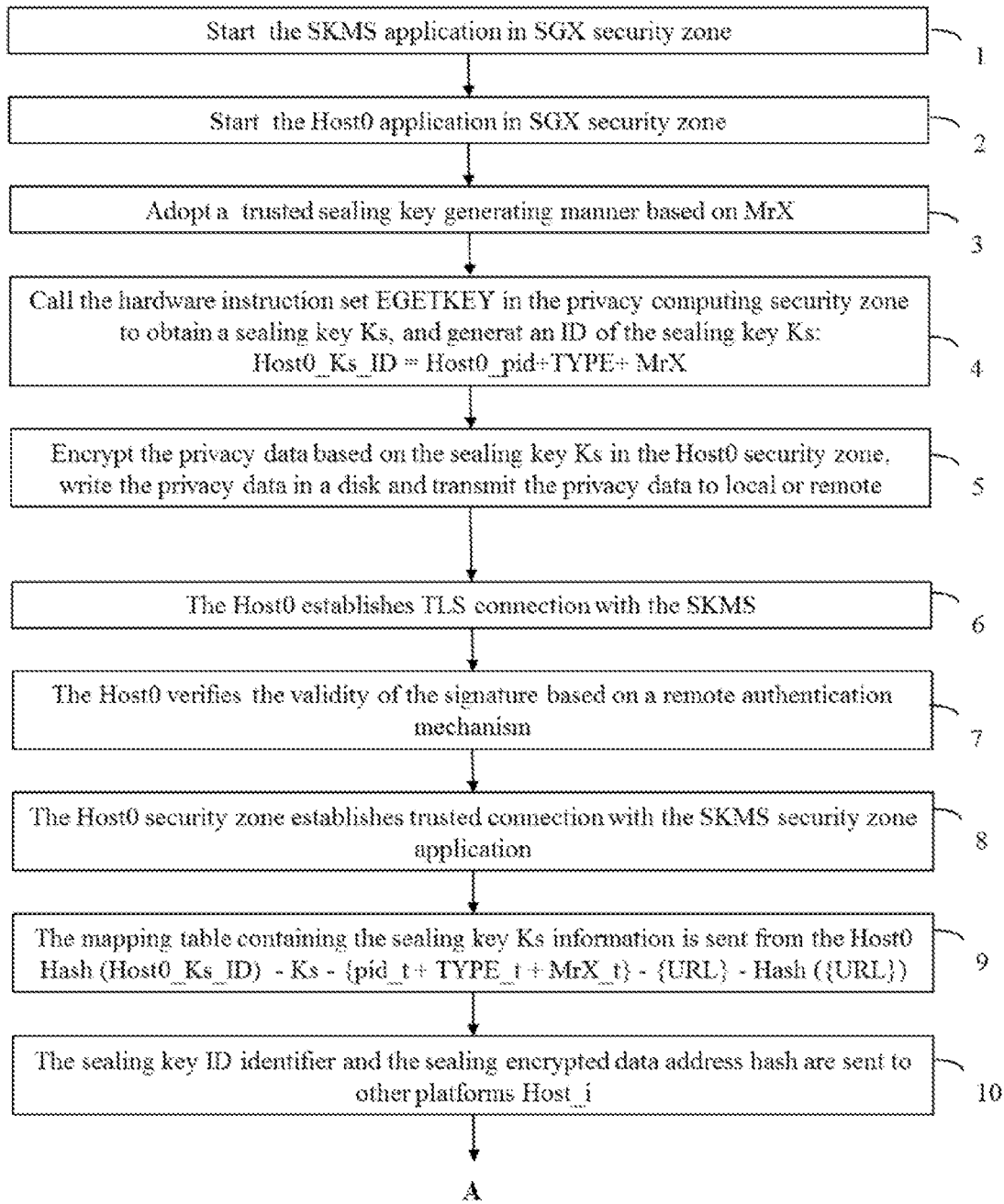
FIG. 2A and FIG. 2B are flow charts of a migration process according to the first embodiment of the present disclosure.
Figure 2B:
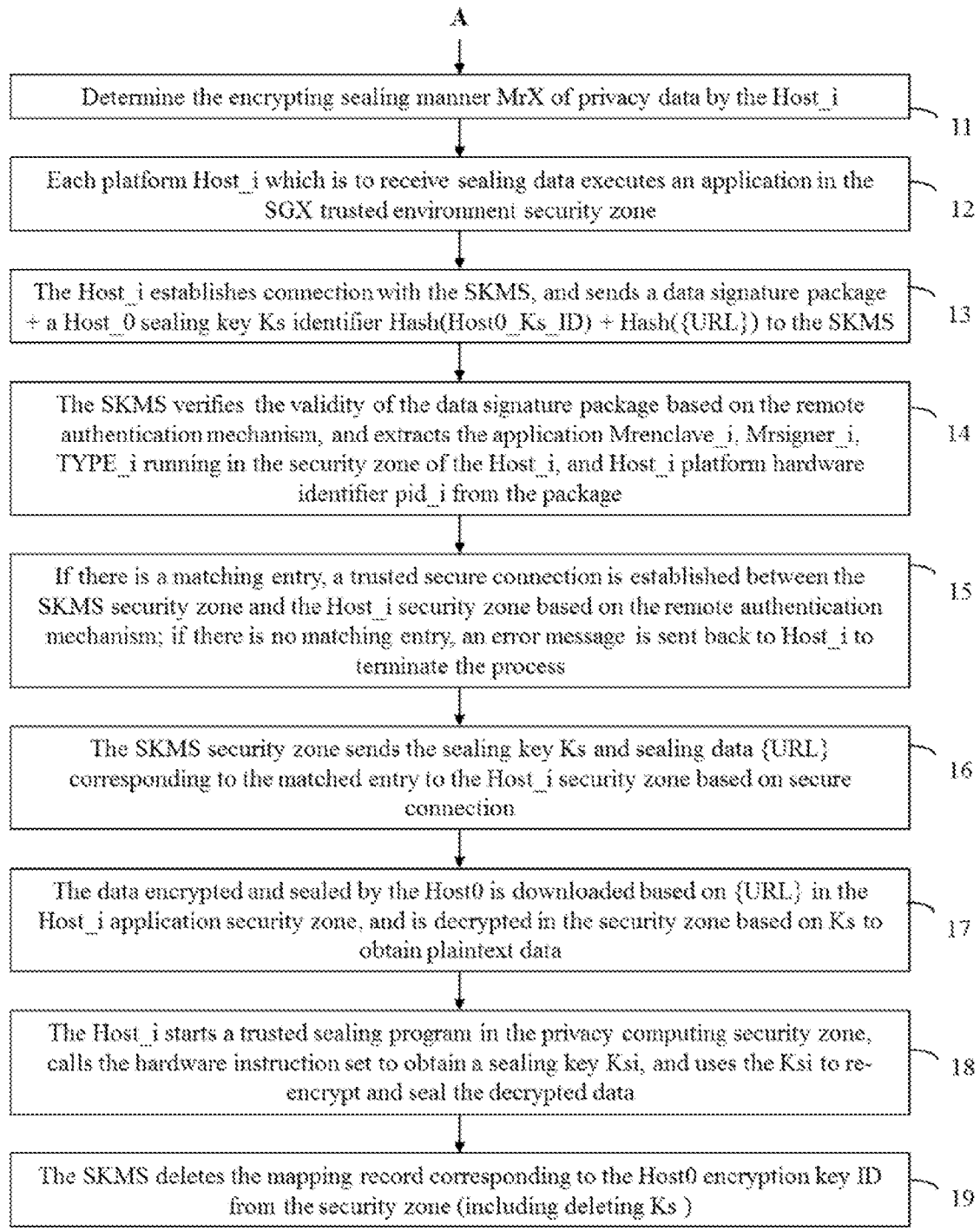

As shown in FIG. 1, FIG. 2A and FIG. 2B, the implementation process of this solution is described in detail hereinafter with the scenario that the trusted sealing data on the Host0 102 can be migrated to other platforms (Host1, Host2 . . . HostN 104) for decryption, writing to a disk and use, as example.

1) A sealing key management service (SKMS) 101 is started, and a key management application App-SKMS is executed during privacy computing SGX. This step may also start to be performed in the following step 6) in practical application.

2) An application APP based on Intel SGX trusted execution environment is executed on the host Host0 102 (to generate an APP security zone "enclave"), and a plurality of privacy computing applications can be executed on the same host.

3) When a certain application running in enclave in a privacy computing security zone of the Host0 102 needs to encrypt privacy data and persistently write the data to a disk, a trusted sealing key generating manner based on MrX is adopted, the MrX is Mrenclave (in which decryption is performed only when applications running in enclave are same) or Mrsigner (in which decryption is performed only when the applications are developed and signed by the same application developer).

4) The hardware instruction set EGETKEY is called in the privacy computing security zone to obtain a sealing key Ks, and an ID of the sealing key Ks is generated: Host0_Ks_ID=Host0pid+TYPE+MrX; where Host0pid is a hardware CPU identifier of the Host0 102; when TYPE=1, MrX is Mrenclave; and when TYPE=2, MrX is Mrsigner. A sealing key ID identifier is defined as: a hash value of Host0_Ks_ID, Hash (Host0_Ks_ID).

5) The privacy data is encrypted based on the sealing key Ks in the Host0 102 security zone, is wrote in a disk and is transmitted to local or remote. A storage address is {URL} which can be one or more encrypted data set.

6) When the Host0 102 wants to migrate the trusted sealing data to other platforms (Host1, Host2 . . . HostN 104), the Host0 102 establishes TLS connection with the SKMS 101 first. A SKMS trusted security zone application is measured and signed by hardware (the measured value is Mrenclave_SKMS), and sent to the Host0 102 trusted security zone.

7) The Host0 102 verifies the validity of the signature based on a remote authentication mechanism (such as Intel SGX IAS or Intel SGX DCAP). When Mrenclave_SKMS is on the white list of the Host0 102, it indicates that the SKMS 101 and applications running thereon are trusted.

8) The Host0 security zone 106 establishes trusted connection with the SKMS security zone 105 application (for example, based on RA-TLS mechanism within the SGX (https://arxiv.org/ftp/arxiv/pap ers/1801/1801.05863.pdf)).

9) The following mapping table information is sent from the Host0 security zone 106 to the SKMS security zone 105:
the sealing key ID identifier Hash(Host0_Ks_ID)—the sealing key Ks—a white list of other platforms {pid_t+TYPE_t+MrX_t}—a sealing encrypted data address {URL}—a sealing encrypted data address hash Hash ({URL}). The platform corresponding to the white list of other platforms is an authorized platform, that is, the platform receiving shared privacy data.

Where pid_t is a hardware identifier of allowed other platforms, and when pid_t is set to 0, it indicates that any hardware platform is allowed.

TYPE_t is an allowing manner, and MrX_t is a value corresponding to the allowing manner. When TYPE_t=1, it indicates that when MrEnclave of the application running on other platforms is verified as being satisfied (the application meets the measured value), the application is allowed; when TYPE_t=2, it indicates that when MrSigner of the application running on other platforms is verified as being satisfied (the application is developed by the same application developer), the application is allowed; and when TYPE_t=0, it indicates that it is not necessary to verify the allowing manner.

10) The Host0 102 notifies other platforms Host1, Host2 HostN 104 to which the encrypted sealing data are to be migrated, and sends following two pieces of information to Host1, Host2 . . . HostN 104: the sealing key ID identifier Hash(Host0_Ks_ID) and the sealing encrypted data address hash Hash({URL}). These two hash values are non-privacy data. The Host0 102 can notify all platforms in a point-to-point or broadcast form.

At this point, the Host0 102 can go offline, and it is not necessary to stay online.

11) The encrypting sealing manner MrX of privacy data is determined by the Host_i 103, in which TYPE_i=1 indicates the Mrenclave manner (in which decryption is performed only when the applications running in enclave are same), or TYPE_i=2 indicates the Mrsigner manner (in which decryption is performed only when the applications are developed by the same application developer). This step can be performed at any time prior to step 18.

12) Each platform Host_i 103 which is to receive sealing data executes an application in the SGX trusted environment security zone. The hardware instruction set measures MrX_i: the application measured value (Mrenclave_i) and the application developer information (Mrsigner_i), and the hardware instruction set measures the hardware identifier pid_i, and the CPU hardware signs the "report" containing the above information to generate a data signature package.

13) The Host_i 103 establishes connection with the SKMS 101, and sends a data signature package+a Host_0 sealing key Ks identifier Hash(Host0_Ks_ID)+Hash ({URL}) to the SKMS 101.

14) The SKMS 101 verifies the validity of the data signature package based on the remote authentication mechanism (Intel SGX IAS or Intel SGX DCAP), and extracts the application Mrenclave Mrsigner_i, TYPE_i running in the security zone of the Host_i 103, and Host_i 103 platform hardware identifier pid_i from the package.

Based on the mapping table previously updated by Host0 102:

a sealing key ID identifier—a sealing key—a white list of other platforms—a sealing encrypted data address—a sealing encrypted data address hash
Hash(Host0_Ks_ID)—Ks—{pid_t+TYPE_t+MrX_t}—{URL}—Hash({URL}), the SKMS 101 verifies whether the following information received from the Host_i 103 has a matching entry with the above table:
Hash(Host0_Ks_ID)+pid_i+TYPE_i+MrX_i (Mrenclave_i or Mrsigner_i)+Hash({URL}).

15) If there is a matching entry, a trusted secure connection is established between the SKMS security zone 105 and the Host_i security zone 107 based on the remote authentication mechanism and the method proceeds to the following steps. If there is no matching entry, an error message (an error code regarding no matching information) is sent back to Host_i 103 to terminate the process.

16) The SKMS security zone 105 sends the sealing key Ks and sealing data {URL} corresponding to the matched entry to the Host_i security zone 107 based on secure connection, and the format may be returned:

Hash(Host0_Ks_ID)—Ks—{URL}, that is, the sealing key Ks and sealing data {URL} is mapped through Hash(Host0_Ks_ID)+pid_i+TYPE_i+MrX_i (Mrenclave_i or Mrsigner_i)+Hash({URL}), and if there is no mapping entry consistent with Hash(Host0_Ks_ID)+pid_i+TYPE_i+MrX_i (Mrenclave_i or Mrsigner_i)+Hash({URL}) in the mapping table, the sealing key Ks and sealing data {URL} cannot be mapped.

17) When the Host_i 103 receives Ks and {URL}, the data encrypted and sealed by the Host0 102 is downloaded based on {URL} in the Host_i application security zone 107, and is decrypted in the security zone based on Ks to obtain plaintext data.

18) The Host_i 103 starts a trusted sealing program in the privacy computing security zone, calls the hardware instruction set (such as Intel SGX EGETKEY instruction, which is determined according to the used privacy computing chip) to obtain a sealing key Ksi, and uses the Ksi to re-encrypt and seal the decrypted data.

19) Host_i 103 notifies the SKMS 101 that the data migration is successful.

When data migration of Host_1, Host_2 . . . Host N 104 are completed, the SKMS 101 deletes the record of Hash(Host0_Ks_ID)—Ks—{pid_t+TYPE_t+MrX_t}—{URL}—Hash({URL}) from the security zone. Ks is not wrote in a disk even in the privacy computing security zone.

The sealing key management service SKMS 101 is a key management service, which can run in the trusted environment to ensure security. The solution can ensure the key security and simplify the deployment cost by using the management service.

Further, the encryption sealing key Ks can also be extended to other privacy data of privacy computing applications.

The specific embodiments described herein are only illustrative of the spirit of the present disclosure. Those skilled in the art to which the present disclosure belongs can make various modifications or supplements to the described specific embodiments or substitute the described specific embodiments in a similar way, which will not deviate from the spirit of the present disclosure or go beyond the scope defined in the appended claims.

What is claimed is:

1. A privacy computing-enabled migration method for large-scale persistent data across platforms, comprising following steps:

S1, establishing a trusted connection between a Host0 security zone and a sealing key management service (SKMS) security zone; wherein a Host0 is a platform for sharing privacy data with other platforms;

S2, sending, by the Host0 security zone, a mapping table having entry contents which each contain a download link, a download link hash value and authorized platform information to the SKMS security zone based on the trusted connection;

wherein the Host0 sends the download link hash value to one or more Hosti; the Hosti is a platform for receiving shared privacy data, i=1, 2, . . . , N;

S3, sending, by the Hosti, a data signature package containing its own identity information to the SKMS;

S4, verifying, by the SKMS security zone, authorized identity of the Hosti based on the data signature package and the mapping table, and establishing the trusted connection with the Hosti after passing verification;

S5, sending, by the SKMS security zone, the download link mapped by the Hosti to a Hosti security zone based on the trusted connection, and downloading, by the Hosti, privacy data based on the download link; wherein the privacy data is the data locally sealed by the Host0 in a trusted manner through a privacy computing-based trusted sealing technology;

S6, decrypting, by the Hosti, the privacy data in a secure environment based on an encryption key acquired in advance, and locally sealing the privacy data in a trusted manner through the privacy computing-based trusted sealing technology;

wherein when the Host0 seals privacy data in a trusted manner, trusted sealing manner is based on one of i) decryption being performed only when application enclaves are same and ii) decryption being performed only when applications are developed by a same application developer;

wherein the data signature package of the Hosti is generated in following manner:

acquiring a i-th application measured value, a i-th application developer information through measuring by a hardware and a i-th hardware central processing unit (CPU) identifier;

signing a report comprising the i-th application measured value, the i-th application developer information and the i-th hardware CPU identifier by a CPU hardware to generate the data signature package; and sending the generated digital signature package for verification.

2. The method according to claim 1, wherein in step S6, the encryption key is a first sealing key provided by the Host0 for sealing corresponding privacy data, and the Hosti decrypts the privacy data in the Hosti security zone based on the first sealing key, and calls a hardware instruction set in the Hosti security zone to obtain a second sealing key, and re-encrypts and seals the privacy data based on the second sealing key;

in step S2, each entry content in the mapping table further includes the first sealing key and a first sealing key ID indicator; the Host0 further sends the first sealing key ID indicator to the one or more Hosti;

in step S5, the SKMS sends the first sealing key mapped by the Hosti to the Hosti security zone.

3. The method according to claim 1, wherein when the Host0 seals the privacy data in a trusted manner, a hardware instruction set is called in the Host0 security zone to obtain the first sealing key, the privacy data is encrypted and is wrote in a disk for storage based on the first sealing key, and a storage address is a Uniform Resource Locator {URL};

the download link is the storage address URL of the privacy data, and the download link hash value is a corresponding address hash, Hash({URL}).

4. The method according to claim 2, wherein when the Host0 seals the privacy data in a trusted manner, a hardware instruction set is called in the Host0 security zone to obtain the first sealing key, the privacy data is encrypted and is wrote in a disk for storage based on the first sealing key, and a storage address is a Uniform Resource Locator {URL};

the download link is the storage address URL of the privacy data, and the download link hash value is a corresponding address hash, Hash({URL}).

5. The method according to claim 1, wherein in step S1, prior to establishing trusted connection between the Host0 security zone and the SKMS security zone, the method further comprises following steps:

executing, by the SKMS, a key management application App-SKMS in the SKMS security zone;

establishing, by the Host0, Transport Layer Security (TLS) connection with the SKMS first, and measuring the key management application App-SKMS in the SKMS security zone by hardware to obtain a SKMS application measured value denoted as Mrenclave_SKMS, and signing and sending the measured value to the Host0 security zone;

verifying, by the Host0, validity of the signature based on a remote authentication mechanism, wherein when the SKMS application measured value Mrenclave_SKMS is on a white list of the Host0, it indicates that the SKMS and application running thereon are trusted, and proceeding to step S1, otherwise, terminating process.

6. The method according to claim 2, wherein in step S1, prior to establishing trusted connection between the Host0 security zone and the SKMS security zone, the method further comprises following steps:

executing, by the SKMS, a key management application App-SKMS in the SKMS security zone;

establishing, by the Host0, TLS connection with the SKMS first, and measuring the key management application App-SKMS in the SKMS security zone by hardware to obtain a SKMS application measured value denoted as Mrenclave_SKMS, and signing and sending the measured value to the Host0 security zone;

verifying, by the Host0, validity of the signature based on a remote authentication mechanism, wherein when the SKMS application measured value Mrenclave_SKMS is on a white list of the Host0, it indicates that the SKMS and application running thereon are trusted, and proceeding to step S1, otherwise, terminating process.

7. The method according to claim 1, wherein in step S6, before the Hosti seals the privacy data in a trusted manner, the trusted sealing manner of the privacy data is selected first, in which a i-th trusted sealing manner of the Hosti TYPE_i=1 indicates that decryption is performed only when application enclaves are same, or the i-th trusted sealing manner TYPE_i=2 indicates that decryption being performed only when applications are developed by a same application developer;

after the data migration from the Host0 to all Hosti is successful, the SKMS deletes the mapping table.

\* \* \* \* \*